US008011682B2

(12) United States Patent
Klein et al.

(10) Patent No.: US 8,011,682 B2
(45) Date of Patent: Sep. 6, 2011

(54) TRANSPORTATION SYSTEM CRADLE, INTERMEDIATE PRODUCT COMPRISING A TRANSPORTATION SYSTEM CRADLE AND A TRANSPORTATION SYSTEM STRUCTURE, ASSEMBLY PLANT FOR MANUFACTURING ASSEMBLY OF A TRANSPORTATION SYSTEM STRUCTURE, AND METHOD FOR MANUFACTURING ASSEMBLY OF A TRANSPORTATION SYSTEM

(75) Inventors: Wolfgang Klein, Neusiedl/See (AT); Andreas Hein, Vienna (AT); Michael Matheisl, Vienna (AT)

(73) Assignee: Inventio AG, Hergiswil (CH)

( * ) Notice: Subject to any disclaimer, the term of this patent is extended or adjusted under 35 U.S.C. 154(b) by 1275 days.

(21) Appl. No.: 11/635,426

(22) Filed: Dec. 7, 2006

(65) Prior Publication Data

US 2007/0216133 A1 Sep. 20, 2007

(30) Foreign Application Priority Data

Dec. 7, 2005 (EP) .................................... 05111810
Apr. 13, 2006 (EP) .................................... 06112651

(51) Int. Cl.
*B60P 3/022* (2006.01)

(52) U.S. Cl. ........................................ 280/404; 198/326

(58) Field of Classification Search .................. 280/404, 280/411.1; 198/326, 321, 316; 414/589
See application file for complete search history.

(56) References Cited

U.S. PATENT DOCUMENTS 1,433,884 A * 10/1922 Harwood ...................... 198/311
2,383,225 A 8/1945 Sorensen et al.
2,967,602 A * 1/1961 Mosier ....................... 198/316.1
3,543,917 A * 12/1970 Duerksen ...................... 198/304
3,727,946 A * 4/1973 Hearn .......................... 280/408
4,260,318 A * 4/1981 Holritz et al. ................. 414/589
4,620,629 A * 11/1986 Dean ......................... 198/836.1
4,759,437 A * 7/1988 Bevins .......................... 198/632
5,272,805 A 12/1993 Akeel et al.
6,089,162 A * 7/2000 Madison ........................... 104/2
6,105,748 A * 8/2000 Pallinger et al. .............. 198/321
6,755,296 B2 * 6/2004 Elwell .......................... 198/304
6,793,061 B2 * 9/2004 Struwe et al. ................. 198/323
6,808,057 B1 * 10/2004 Nirmal et al. ................. 198/312
7,308,968 B2 * 12/2007 Denison .......................... 182/42
2003/0127255 A1 * 7/2003 Hammonds .................. 180/6.48
2004/0238322 A1 * 12/2004 Viola ........................... 198/321
2005/0173163 A1 * 8/2005 Hammonds .................... 180/6.5
2005/0279611 A1 * 12/2005 Ossendorf et al. ............ 198/321
2006/0186625 A1 * 8/2006 Terpsma et al. ............ 280/47.35
2006/0254878 A1 * 11/2006 Krampl ......................... 198/321
2007/0029161 A1 * 2/2007 Streibig et al. ................ 198/326
2008/0067034 A1 * 3/2008 Illedits et al. ................. 198/330
2008/0164117 A1 * 7/2008 Drahohs et al. ............... 198/321
2009/0173596 A1 * 7/2009 Fang et al. .................... 198/330

FOREIGN PATENT DOCUMENTS

GB 2352 692 A 2/2001

* cited by examiner

*Primary Examiner* — Kevin Hurley
*Assistant Examiner* — Tashiana Adams
(74) *Attorney, Agent, or Firm* — Ladas & Parry LLP

(57) ABSTRACT

A transportation system cradle cradles and moves a transportation system structure of a transportation system in an assembly process. The transportation system cradle contains a drive unit connectable to the transportation system structure to move or transport the transportation system structure. The transportation system cradle also has at least one first and second cradle units that are designed to cradle a first or second foot area of the transportation system structure. Intermediate products, formed of a transportation system structure and a cradle, may be moved between assembly stations in an assembly plant.

13 Claims, 5 Drawing Sheets

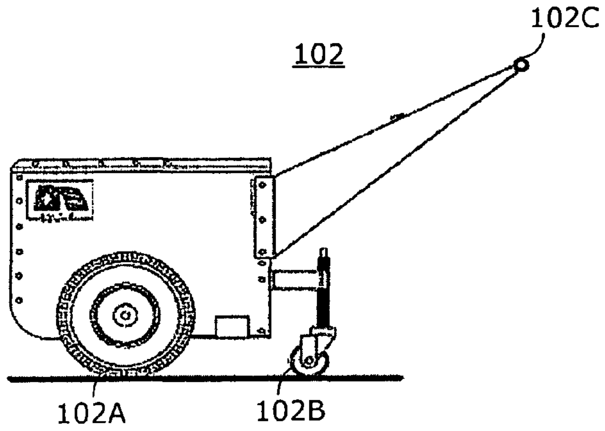
FIG. 3A
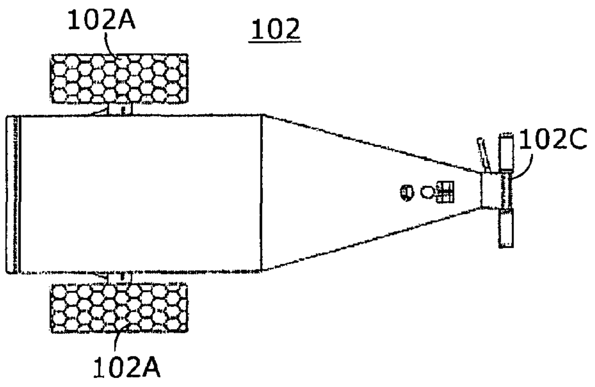
FIG. 3B
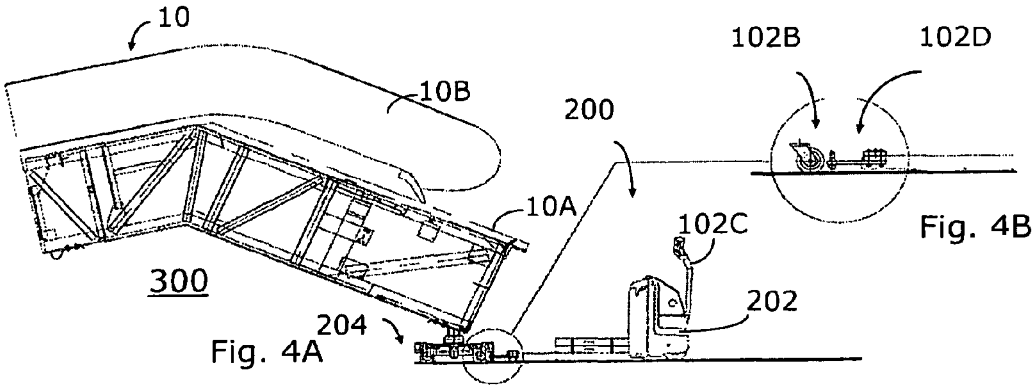
Fig. 4A
Fig. 4B

FIG. 7A
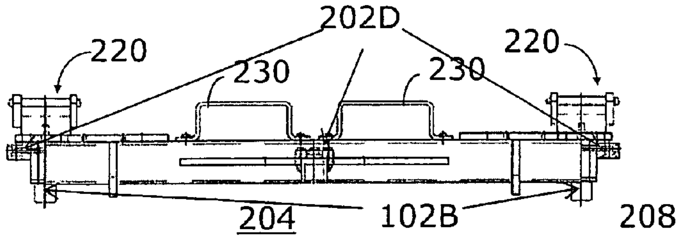
FIG. 7B
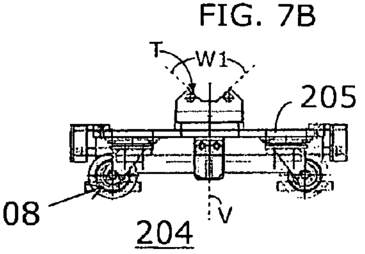
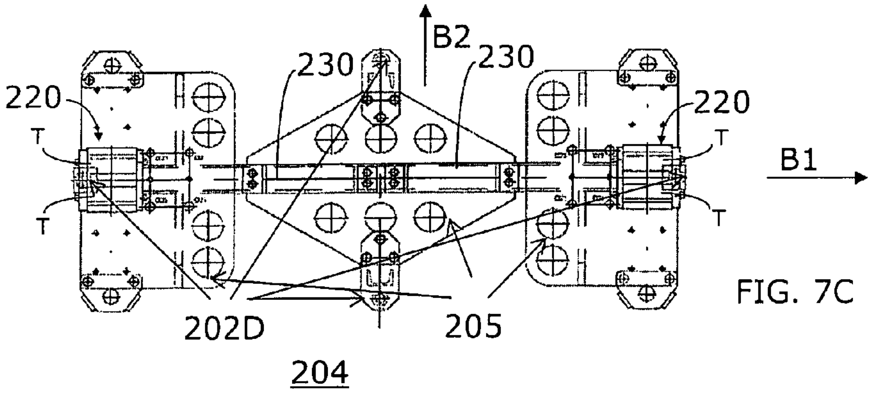
FIG. 7C
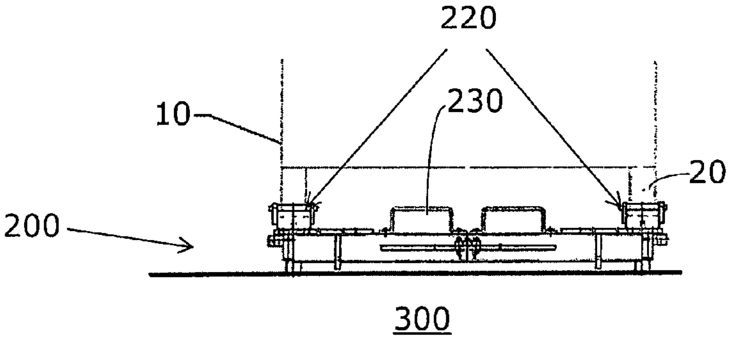
FIG. 8A
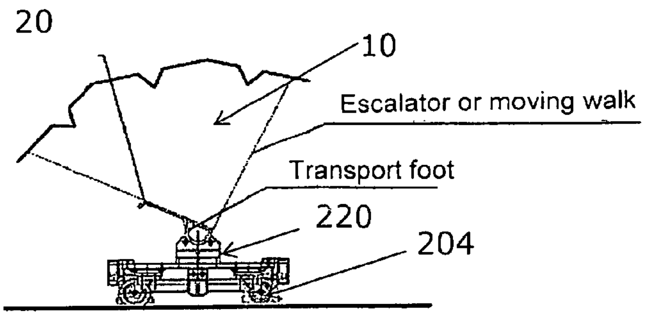
FIG. 8B

TRANSPORTATION SYSTEM CRADLE, INTERMEDIATE PRODUCT COMPRISING A TRANSPORTATION SYSTEM CRADLE AND A TRANSPORTATION SYSTEM STRUCTURE, ASSEMBLY PLANT FOR MANUFACTURING ASSEMBLY OF A TRANSPORTATION SYSTEM STRUCTURE, AND METHOD FOR MANUFACTURING ASSEMBLY OF A TRANSPORTATION SYSTEM

The invention relates to a transportation system cradle, an intermediate product, an assembly plant, and a method for the manufacturing assembly of a transportation system. Manufacturing assembly is defined as the assembly of various individual parts and subassemblies of an escalator or of a moving walk.

BACKGROUND OF THE INVENTION

In the context of the present description, transportation systems are escalators and moving walks. Transportation system cradles within the meaning of the invention are particularly used in rhythmic manufacturing assembly of series of transportation systems in assembly lines as described in EP Patent Application 05111810.7 of the present applicants. Therein, each transportation system, or each transportation system structure, passes through a plurality of assembly stations. A series of transportation systems can consist of several transportation systems, typically between three and forty transportation systems. The transportation system structures that are simultaneously undergoing manufacturing assembly can be identical or different in their length, height and/or width. During an assembly phase, a specific assembly step, that in itself can consist of sub-steps, is executed at each assembly station. These assembly phases are preferably of at least approximately the same duration in the various assembly stations, for example about three hours. When the assembly steps at all the assembly stations have been completed, a transfer phase follows. During the transfer phase, transportation system structures whose manufacturing assembly is complete are removed, while further transportation system structures are taken to the respective next following assembly station, and "new" transportation system structures are introduced for which manufacturing assembly is beginning.

For rationalized and rhythmic manufacture it is important that the transfer of all transportation systems involved takes place as synchronously as possible and is as short as possible, even if the individual transportation systems differ in their lengths.

Such a short and synchronous transfer phase cannot be realized with conventional means. The only device known, from U.S. Pat. No. 6,808,057, is a stair that is mounted on a loading ramp of a truck and whose angle of inclination is adjustable; from U.S. Pat. No. 4,260,318 a device is known for moving pre-assembled escalators to their installation site. However, neither device, even with minor design modifications, is suitable for the transfer of transportation systems undergoing manufacturing assembly as described above, since the requirements for stability, rigidity, maneuverability, accuracy, and flexibility in such use are higher than met by the known devices.

The objective of the present invention is to rationalize the manufacturing assembly of transportation system structures and in particular to:

- create a transportation system cradle with which a transportation system can be taken to and removed from an assembly station during a transfer phase;
- provide an intermediate product that consists of a transportation system structure and a transportation system cradle;
- provide an assembly plant, for example an assembly shop, for the rationalized manufacturing assembly of an intermediate product; and
- create a method for the manufacturing assembly of a transportation system.

BRIEF DESCRIPTION OF THE INVENTION

The objective is fulfilled according to the invention by a transportation system cradle having a mobile drive unit for connection to the transportation system structure to be moved and cradle units driven by the drive unit that receive and cradle the transportation system structure.

The combination of a transportation system structure undergoing assembly and a transportation system cradle is an intermediate product. The intermediate product can be transferred between assembly stations and is positioned in a stationary manner while at an assembly station to allow a station-specific assembly step to be performed.

An assembly plant in which the transportation system cradles are used has a series of assembly stations and a plurality of cradles to be connected with transportation system structures to undergo assembly. A control system simultaneously and/or rhythmically transfers the intermediate products between assembly stations and can also control the mating of the transportation system structures to the cradles and their subsequent separation.

The new transportation system cradle must, in particular, be so designed that connection to, and disconnection from, the transportation system structure can be performed quickly and easily even though a safe coupling must be effected. Since a plurality of transportation systems must be cradled simultaneously, it is advantageous to make additional reserve transportation system cradles available, and the individual transportation system cradles should therefore be inexpensive and simple in their manufacture and maintenance. As already stated, the transportation system structures can be of differing widths or lengths, which means that the transportation system cradles should be correspondingly adaptable.

A transportation system cradle according to the invention consists of a drive unit and at least a first and a second cradle unit. As a cradle unit, a cradle platform with rollers or possibly with runners can be used.

The drive unit can be a tractor, preferably with electric drive. Such a tractor can have, for example, two axles and be couplable to the transportation system structure by means of a connecting bar or a flexible element, for example a chain or a rope, so that the drive unit is directly connected to the transportation system structure.

Instead of such a tractor, a kind of forklift truck can be used that docks onto a cradle platform with heavy duty rollers that serve as a cradle unit. The transportation system structure is cradled by this cradle platform and a further cradle unit. In this case, the drive unit is connected to the transportation system structure indirectly via the cradle platform.

An intermediate product according to the invention is an assembly unit that consists of a transportation system cradle, and cradled upon it a transportation system structure of a transportation system that is undergoing manufacturing assembly. The transportation system cradle serves both to transfer the transportation system structure autonomously and thereby to take it to an from, for example, assembly stations, as well as to serve in assembly stations as a support for the transportation system structure so as to hold it stationary and fix it or set it down. At least during assembly, the transportation system cradle and the transportation system structure form one unit that is therefore referred to hereafter as an intermediate product.

An assembly plant according to the invention can be, for example, an assembly shop, factory workshop, gantry hall, outdoor space, air-inflated tent, roofed hall, or roofed-over space. The assembly plant consists of a number of assembly stations, a plurality of transportation system cradles, and a control system. The assembly stations are visited one after the other, usually in a prespecified sequence, by the intermediate products and, during a prespecified assembly period, a station-specific assembly step is performed on a transportation system structure at each assembly station. On completion of the assembly step, the intermediate products are transferred into the respective following assembly stations during a transfer period. The control system ensures that the assembly steps and the transfer steps for all intermediate products that are undergoing manufacturing assembly are executed simultaneously and rhythmically. The control system takes into account that the intermediate products and the transportation system are embodied differently. The assembly steps in the respective individual assembly stations are station-specific but controllable in such manner that they are adapted to the respective intermediate product that is present at the station. The result is an assembly system in which the advantages and characteristics of individual manufacture are combined with the advantages and characteristics of series manufacture.

BRIEF DESCRIPTION OF THE DRAWINGS

Further details and advantages of the invention are explained below in relation to exemplary embodiments and by reference to the drawings, wherein:

FIG. 3A is a side view of a drive unit of the transportation system cradle shown in FIG. 1;

FIG. 3B is a top plan vie of the drive unit shown in FIG. 3A;

FIG. 4A is aside view of a second exemplary embodiment of a transportation system cradle according to the invention, of which only the drive unit and the first cradle unit are shown, with part of a transportation system structure;

FIG. 4B is an enlarged view of the detail circled in FIG. 4A;

FIG. 7A is a front view of the drive unit shown in FIGS. 6A and 6B with a cradle unit;

FIG. 7B is a side view of the cradle unit shown in FIG. 7A;

FIG. 7C is a top plan view of the cradle unit shown in FIGS. 7A and 7B;

FIG. 8A is a front (or rear) view of an intermediate product consisting of the cradle unit shown in FIGS. 7A to 7C and a transportation system structure, without a drive unit;

FIG. 8B is a side view of the cradle unit shown in FIG. 8A on the transportation system structure and without a drive unit.

DETAILED DESCRIPTION OF THE INVENTION

Identically functioning parts are not shown referenced with the same numbers in all of the figures. Descriptions such as above, below, right, left relate to the illustration of the parts in the figures or the direction of movement of the transportation system cradle.

Figure 1:
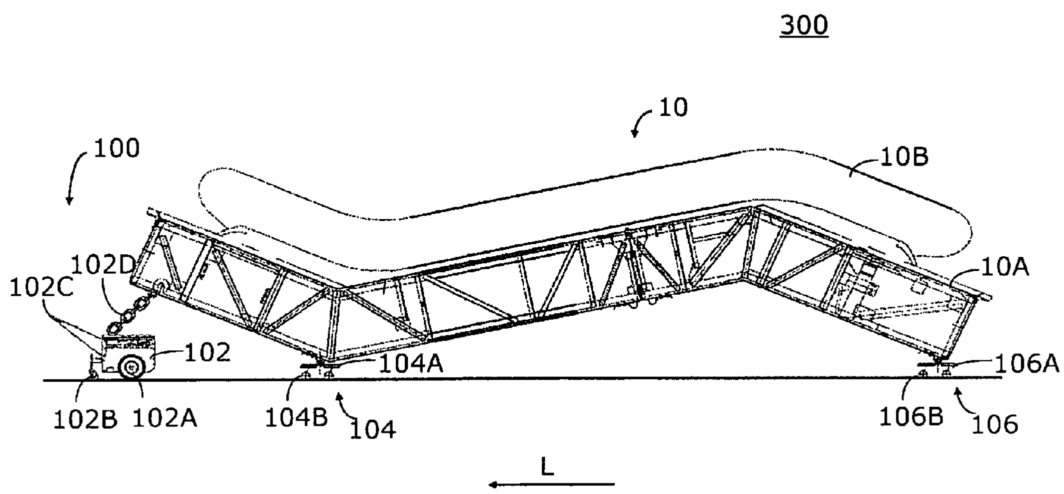
FIG. 1 is a simplified side view of a first exemplary embodiment of an intermediate product with a transportation system cradle according to the invention coupled to a transportation system structure for an escalator, during a movement in a first direction.

Shown in FIG. 1 is an intermediate product 300 including a transportation system cradle 100 that comprises a drive unit 102, a first cradle unit 104, and a second cradle unit 106. The transportation system cradle 100 is coupled to the left, lower end of transportation system structure 10 of the intermediate unit, in other words to the structure 10A of an escalator with a balustrade 10B, in such manner that movement to the left in the direction of the arrow L is possible.

In the present exemplary embodiment, the drive unit 102, shown enlarged in FIGS. 3A and 3B and can be described as a pulling element or self-propelled drive element, is a tractor with a roller-wheel pair 102A and a steering-roller arrangement 102B. The drive unit 102 also contains an actuating member 102C. Fastened to the drive unit 102 is a coupling element 102D with which the drive unit 102 is coupled, for example electromagnetically, to or onto the transportation system structure that is to be moved.

In the present exemplary embodiment, the coupling element 102D is a flexible element that only responds to tension and that is therefore only suitable for pulling the transportation system structure 10. The coupling element 102D can also be rigid, for example a push bar or a push-pull bar, so that the transportation system structure 10 can also be pushed and steered.

The cradle units 104 and 106 can each consist of a pair of part-cradle units and can be identically or differently formed. The cradle units 104, 106 each consist of a platform proper, 104A, 106A respectively, and two respective roller axles that are fitted with the roller pairs 104B, 106B. Instead of the roller pairs, one or more cylinders or one or more runners can be provided.

Figure 2:
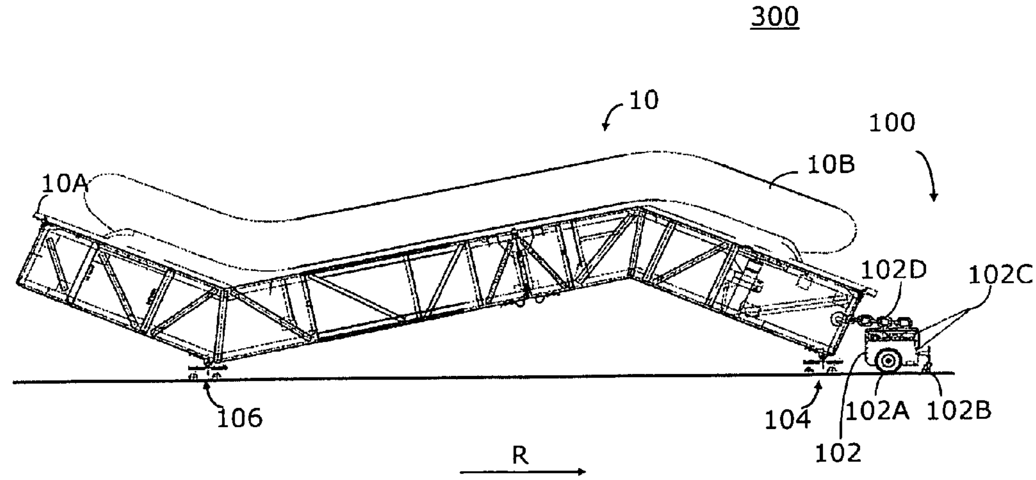
FIG. 2 is a view of the intermediate product shown in FIG. 1 during a movement in the opposite direction.

Shown again in FIG. 2 are the transportation system cradle 100 with the drive unit 102 and cradle units 104 and 106, and the transportation system structure 10. The drive unit 102 is coupled to or onto the right, upper end of the transportation system structure 10 in such manner that the transportation system structure 10 can be pulled to the right in the direction of the arrow R.

FIGS. 4A to 8B relate to a second exemplary embodiment of the transportation system cradle according to the invention. FIG. 4A shows one such transportation system cradle 200 with part of the transportation system structure 10 including balustrade 10B and truss 10A.

Figure 5A:
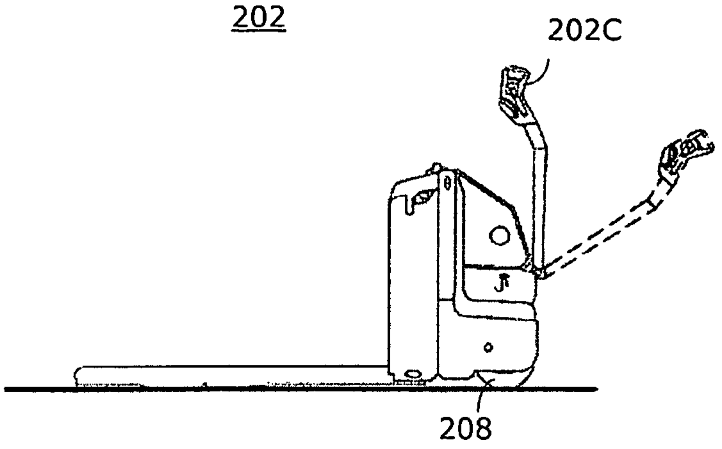
FIG. 5A is a side view of the drive unit of the transportation system cradle shown in FIG. 4.
Figure 5B:
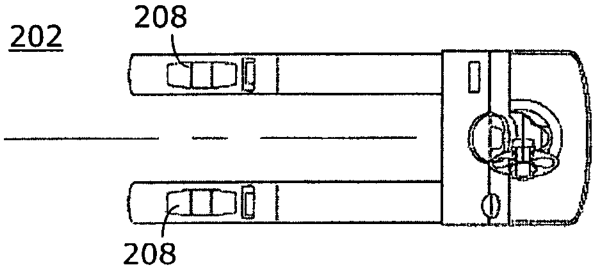
FIG. 5B is a top plan view of the drive unit shown in FIG. 5A.
Figure 6A:
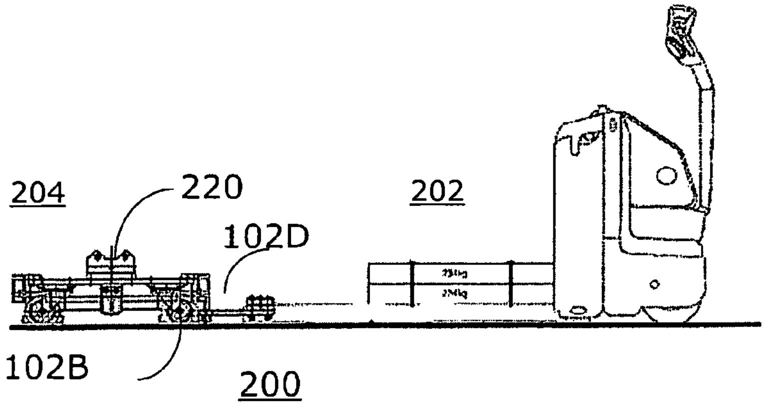
FIG. 6A is aside view of the drive unit shown in FIGS. 5A and 5B with a docked first cradle unit.
Figure 6B:
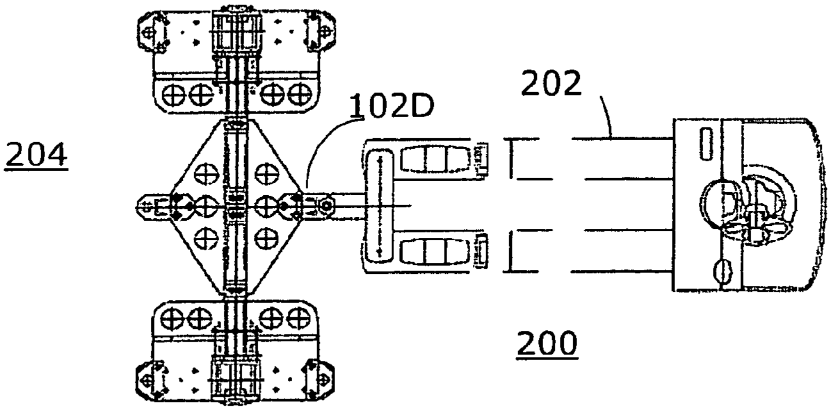
FIG. 6B is a top plan view of the drive unit shown in FIG. 6A with a cradle unit.

The transportation system cradle 200 comprises a drive unit 202 in the form of a conventional forklift truck or self-propelled heavy-duty forklift truck that is shown more precisely in FIGS. 5A and 5B. Moreover, the transportation system cradle 200 contains a drive unit 202 with a first, docked cradle unit 204 and usually at least one second cradle unit that is not shown. FIGS. 6A and 6B show the drive unit 202 with the docked cradle unit 204.

Details of the cradle unit 204 are shown in FIGS. 7A to 7C. The cradle unit 204, essentially a cradling platform, is mounted so as to be mobile on four heavy-duty rollers 208.

docking means are provided to connect the drive unit 202 to the cradle unit, in the present example a pin or bolt on the drive unit 202. Complementary pin receptacles or tongues and/or eyes and/or loops or rings or eyebolts or chain links or carabiner are present on the cradle unit 204. In the present embodiment, the cradle unit 204 has several, namely four, pin receptacles. The drive unit 202 docks onto the cradle unit 204 by its pin or bolt engaging into any one of the four pin receptacles. By pulling and pushing, it is thereby possible to move the cradle unit in different and highly diverse directions.

The cradle unit 204 also has transport foot receptacles 220. The transport foot receptacles 220 may be embodied as transport foot claws or forks. The transport foot receptacles 220 serve to accommodate corresponding transport feet 20 of the transportation system structure 10 and can also be height, depth, and width-adjustable. In a first transfer phase, the transportation system structure 10 is lowered, usually by means of lifting tackle, bridge crane or gantry crane, onto the cradle unit 204 in such manner that its transport feet 20 are lowered into the transport foot receptacles 220 (see FIG. 8A). The transport foot receptacles 220 prevent vertical downward movement and horizontal sliding or slipping away of the transportation system structure 10 from the cradle unit 204. The transport foot 20 of the transportation system structure 10 is embraced by the transport foot receptacle 220 since, with respect to shape and size in both the lengthwise direction and the crosswise direction, the recess of the transport foot receptacle 220 and the transport foot 20 are matched to each other or complementarily embodied. In the present exemplary embodiment, the fork-shaped or claw-shaped transport foot receptacle 220 prevents forwards or backwards movement of the transportation system structure 10 relative to the cradle unit 204. With some play, the width of the transport foot receptacle 220 is also adapted to the transport foot 20 in such manner that lateral or crosswise movement movement of the transportation system structure 10 relative to the cradle unit 204 is also impossible. In addition, lateral bounding plates prevent sliding away or slipping of the transport foot 20 in the crosswise direction.

The transport foot receptacles 220 are fastened pairwise on the cradle platform proper 205 of the transportation system cradle 204 in such manner that each pair of the transport foot receptacles 220 can accommodate a left and a right transport foot 20 of the transportation system structure 10, left and right referring to the direction of travel of the finished transportation system (see FIG. 8A).

Since the transportation system structures 10 that are to be moved do not all have the same width, the cradle unit 204 is width-adjustable. To this end, firstly the cradle platform proper 205 and secondly the transport foot receptacles 220 are embodied in such manner that the latter, depending on the width of the transportation system structure 10 that is to be accommodated or transferred, can be arranged in various widths or at various mutual distances on the cradle platform 205. Especially simple is an arrangement in which the transport foot receptacles 220 need only be reinserted or regripped or rescrewed. This has the advantage that faulty or worn transport foot receptacles 220 can be replaced in a simple manner. The transport foot receptacles 220 can also be laterally adjustably and lockably held in guides on the cradle platform 205 in such manner that stepless or stepped width adjustment is possible.

The transport foot receptacles 220 and the transport feet 20 are embodied in such manner that slight adjustment of the vertical position and/or inclination and/or horizontal position of the transportation system structure 10 is possible.

The cradle units 204 of the transportation system cradles can be embodied in such manner that they serve not only during the transfer phases as mobile supports, but also during the assembly phases as stationary supports for the transportation system structures 10.

Alternatively, the assembly stations can also contain their own stationary cradle units. In this case, preferably foot receptacles or transport foot receptacles 220 are provided that are embodied in such manner and can be arranged in such manner that they can accommodate the transport feet 20.

In a further embodiment, the assembly stations can contain stationary cradle units 204 but without foot receptacles. In this case, the transportation system structures 10, either together with their transport feet 20 and the transport foot receptacles 220, or without the transport foot receptacles 220, are supported on the stationary cradle units 204 in the assembly stations during the assembly phases. Furthermore, the transportation system structure 10 and/or the transport foot 30 rest on the cradle platform 205.

The feet or transport feet 20 and the foot receptacles 220, especially if they serve not only as mobile transport foot receptacles during the transport phases but also as stationary foot receptacles during the assembly phases, are preferably, but not necessarily, height-adjustable. By this means, the vertical position of the individual foot areas of the transportation system structures 10 is set or adjusted.

The height-adjustability can be attained with an arrangement in which the foot receptacle 220 has two supporting surfaces T that are arranged at an angle W1 and symmetrically to a vertical plane V. The transport foot 20 that is to be accommodated is embodied in a complementary fashion and rests at least partly on or against the supporting surface T. The distance of the supporting surface T from the vertical plane V can be changed. On reduction of this distance, the transport foot 20 is raised, and on increasing this distance the transport foot 20 is lowered, the vertical axis of the transport foot 20 remaining in place, so that no horizontal movement of the transport foot 20 and thereby the transport system structure 10 occurs. An additional advantage of this arrangement is that lowering of the transport feet 20 is facilitated in that, through the inclined supporting surface T of the foot receptacle 220, to some extent a self-centering effect is produced.

The cradle unit 204 is also fitted with two lifting brackets 230 that are mounted on the cradle platform proper 205. Alternatively, only one lifting loop, or one or more eyebolts or other means, could be provided into which a lifting crane can engage for the purpose of transporting the transportation system cradle 200 with the aid of a lifting device such as a crane. The lifting brackets can also be so formed and arranged that they can be grasped and raised by a forklift truck.

Figure 9:
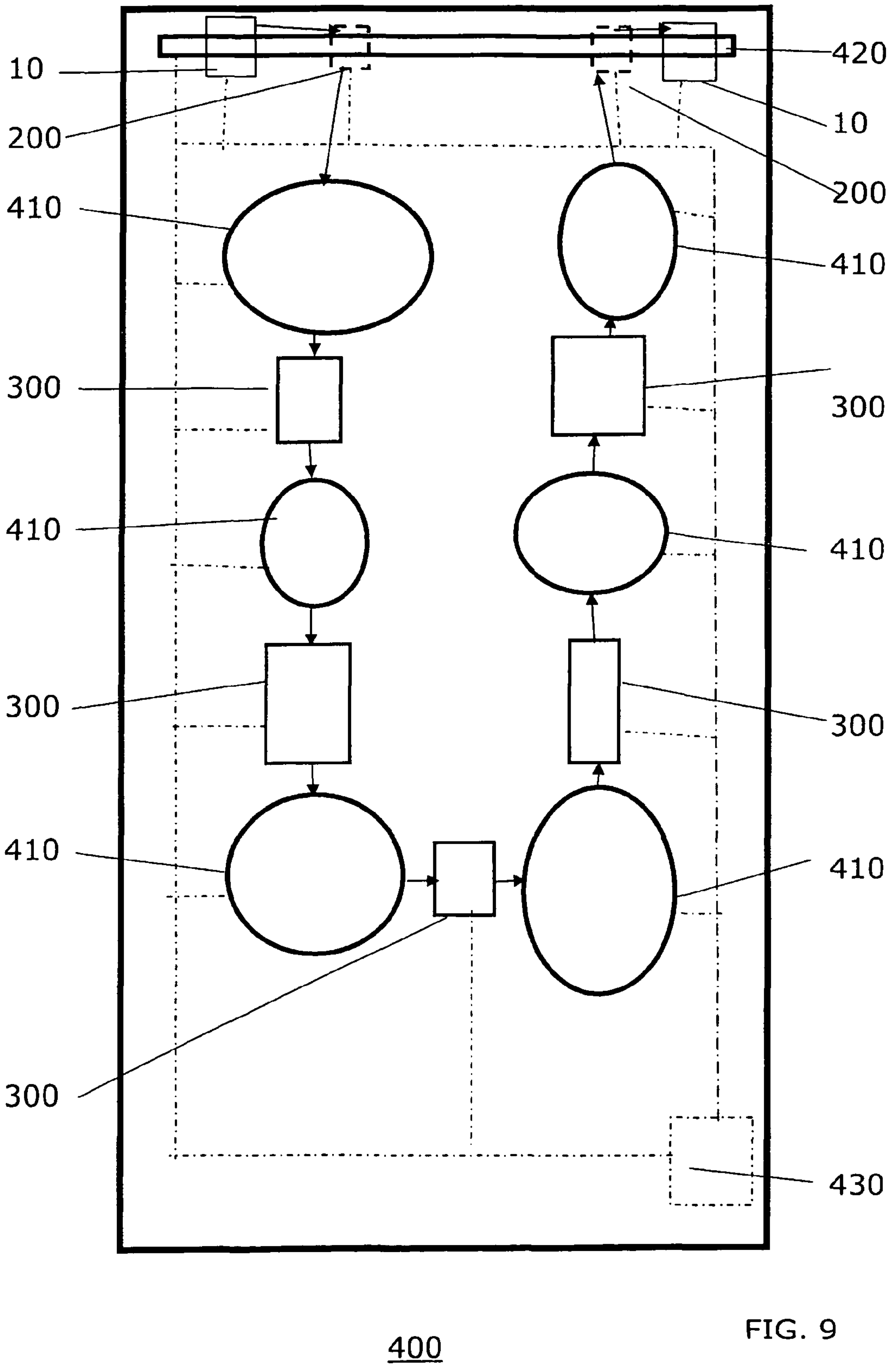
FIG. 9 is a highly simplified plan view representation of an assembly plant according to the invention.

In FIG. 7C, an important aspect is indicated by the arrows B1 and B2. This is that, in a currently preferred embodiment, the cradle unit 204 according to the invention can be moved both forwards (in direction B2) and sideways (in direction B1). This obviates complicated and prolonged maneuvering of the very large and heavy load or loads. In FIG. 9 this type of lateral movement is used at the lower end of the assembly plant where movement from left to right takes place. Self-evidently, movement in the opposite direction to B1 and B2 (backwards and to the other side) is also easily possible.

FIGS. 8A and 8B show an intermediate product 300, namely the cradle unit 204 with the transportation system structure 10 arranged on it, the transport feet 20 being arranged in the transport foot receptacles 220.

FIG. 9 shows an assembly plant 400 during a transfer phase. The assembly plant 400 consists of several assembly stations 410 that are laid out to execute different station-specific assembly steps, it being possible for each assembly step to comprise individual part-steps. Also belonging to the assembly stations 410 is a plurality of transportation system cradles 200 and a control system 430 that fully or partly automatically controls the processes in the assembly plant 400. A hoisting device 420, for example a gantry crane, bridge crane or swing-jib crane, serves to lower the transportation system structures 10 onto a transportation system cradle 200 and remove them again from the transportation system cradles 200. Further hoisting devices are not necessary, so the assembly plant 400 does not need any elaborate building structures, which is a clear advantage in comparison to conventional assembly shops.

A first transportation system cradle 200, shown at top left of FIG. 9, is provided to cradle a transportation system structure 10. Further transportation system cradles 200 have already cradled other transportation system structures 10 and, together with the transportation system cradled, form intermediate products 300. During the transfer phases, the intermediate products 300 are transported by means of the autonomously movable transportation system cradles 200 in the direction of the arrows to the individual assembly stations 410 or removed from them. The intermediate products 300 can be transferred both in their lengthwise direction and perpendicular to this direction, as between the assembly stations shown at the bottom of FIG. 9. During the assembly phases, the intermediate products 300 are stationary in the assembly stations 410. On conclusion of all individual assemblies, the transportation system structure 10 is removed from the respective completely processed intermediate product 300, which can be done with the aid of the already mentioned hoisting device 420, as shown at the top right of FIG. 9. The control system 430, indicated symbolically by chain-dotted lines, serves to control the overall process of the manufacturing assembly. The control system 430 can also include only parts of the assembly plant 400, for example only the assembly stations 410. The control 430 can control the assembly stations 410 as well as semi-robots and robots that are located in the assembly stations, as for example welding robots, spot-welding robots, glass-insertion robots, etc.

We claim:

1. A cradle system for supporting and moving a structure of a moving walk or escalator during an assembly process, comprising an wheeled cradle unit interconnectable to at least one other wheeled cradle unit for supporting the structure and a mobile drive unit removably connected to the cradle unit for moving the cradle unit and the structure supported thereon, the cradle unit comprising a transport-foot receptacle to accommodate a transport foot of a foot area of the structure in such a manner that the foot is secured against horizontal displacement and vertical downward displacement relative to the transport foot receptacle.

2. The cradle system according to claim 1, wherein the drive unit and the cradle unit have complementary docking means to dock the drive unit to the cradle unit.

3. The cradle system according to claim 1, wherein the cradle unit has a plurality of transport foot receptacles arranged in pairs mirror-symmetrically to a lengthwise central plane, the cradle having means to change a distance between the transport foot receptacles of a pair to adapt a width of the cradle to the structure supported.

4. The cradle system according to claim 2, wherein the docking means has a first docking element coupled to the drive unit and a second docking element coupled to the cradle unit.

5. The cradle system according to claim 4, wherein the cradle unit has a plurality of docking elements arranged in such a manner that one of the docking elements can be alternatively brought into engagement with another of the docking elements so as to allow the cradle unit to be alternatively moved by means of the drive unit in different and highly diverse directions.

6. The cradle system according to claim 5, wherein each of the plurality of docking elements on the cradle unit is a pin receptacle or bolt receptacle and the docking element on the drive unit is a corresponding pin or bolt.

7. The cradle system according to claim 1, 2, 3, 4, 5, or 6, wherein the cradle has means for engagement of an external lifting device, lifting tackle or crane.

8. The cradle system according to claim 1, wherein the transport foot receptacle has two supporting surfaces that stand relative to each other at a foot angle, with means for setting a mutual distance therebetween to conform to complementarily formed foot surfaces of the transport foot so that the supporting surfaces and the foot surfaces form a hoisting system for height-adjustment of the transportation system structure.

9. An intermediate product for the assembly of an escalator or moving walkway system, comprising a system structure that is undergoing assembly and a cradle at an assembly station on which the structure is supported, the structure having a plurality of feet and the cradle having a plurality of foot receptacles, each foot receptacle being embodied and arranged complementarily to a foot of the structure and having means for cradling a received foot, the intermediate product being autonomously transferable for the purpose of being taken to the assembly station and removed from the assembly station, the intermediate product having means for stationary positioning at the assembly station upon the cradle at the assembly station for the purpose of executing a station-specific assembly step on the structure.

10. The intermediate product according to claim 9, wherein the cradle has means for securing the feet during assembly phases against at least one of horizontal, vertical and downwards directed movements relative to the foot receptacles.

11. The intermediate product according to claim 9, wherein the foot receptacles of the cradle are height adjustable for the purpose of horizontalizing or horizontally aligning the structure for an assembly phase before execution of a station-specific assembly step.

12. An assembly plant for manufacturing assembly and/or assembly of escalator or moving walk systems, comprising: a sequence of assembly stations, each of which is capable of executing a station-specific assembly step on a system structure; a plurality of system cradles for supporting a corresponding plurality of systems structures, of which at least one cradle, together with a respective system structure form an intermediate product; and a control system to simultaneously and/or rhythmically transfer intermediate products into respective ones of the assembly stations for assembly or manufacturing assembly of the system structures of the intermediate products in the respective assembly stations and subsequently transfer the intermediate products to a respective subsequent assembly station.

13. The assembly plant according to claim 12, characterized in that the plant has at least one lifting device for bringing or lifting a transportation system structure onto a transportation system cradle or removing a transportation system structure from a transportation system cradle.

* * * * *